United States Patent [19]

Orthman

[11] 4,102,406
[45] Jul. 25, 1978

[54] GROUND CONDITIONING DEVICE AND METHOD OF CONDITIONING SOIL

[75] Inventor: Henry K. Orthman, Lexington, Nebr.

[73] Assignee: Orthman Manufacturing, Inc., Lexington, Nebr.

[21] Appl. No.: 761,769

[22] Filed: Jan. 24, 1977

[51] Int. Cl.² ............... A01B 35/16; A01B 35/28
[52] U.S. Cl. .......................... 172/540; 172/177; 172/184; 172/548
[58] Field of Search ................ 172/540–556, 172/21, 22, 1, 90, 573, 711, 184, 500, 265, 462, 621, 618, 177; 267/155

[56] References Cited

U.S. PATENT DOCUMENTS

| 2,070,425 | 2/1937 | Engel | 172/573 X |
|---|---|---|---|
| 2,225,204 | 12/1940 | Benjamin | 172/1 X |
| 2,227,641 | 1/1941 | Garey | 172/549 |
| 2,228,389 | 1/1941 | Garey | 172/548 |
| 2,229,746 | 1/1941 | Krause | 172/548 |
| 2,293,173 | 8/1942 | Rohlfs | 172/90 |
| 3,151,685 | 10/1964 | Field | 172/556 |
| 3,393,751 | 7/1968 | Mascaro | 172/21 |
| 3,461,973 | 8/1969 | Geurts | 172/264 |
| 3,702,638 | 11/1972 | Takata | 172/556 X |
| 4,027,899 | 6/1977 | Hawes et al. | 267/155 |

Primary Examiner—Paul E. Shapiro
Attorney, Agent, or Firm—Zarley, McKee, Thomte, Voorhees & Sease

[57] ABSTRACT

Water-holding and retaining cavities are formed in furrows with the cavities being staggered between adjacent rows. An arm spring biased downwardly carries a hub having spikes in planes laterally spaced apart with the spikes around the hub being staggered between the planes. Each spike is concave longitudinally and in transverse cross section and is secured to opposite sides of a disc mounting plate by a pair of clamping elements one of which is integrally connected to the mounting plate.

3 Claims, 6 Drawing Figures

U.S. Patent  July 25, 1978  4,102,406
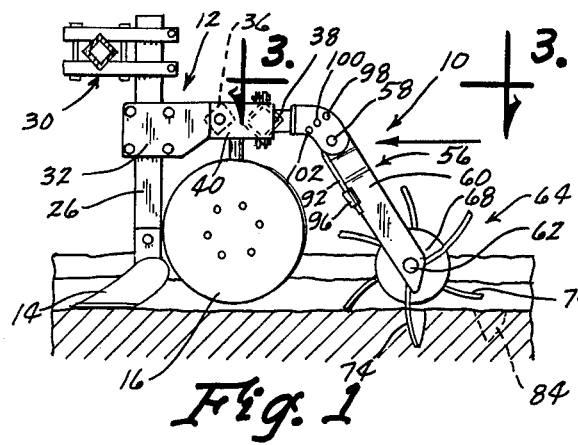

GROUND CONDITIONING DEVICE AND METHOD OF CONDITIONING SOIL

BACKGROUND OF THE INVENTION

In bed or furrow farming a series of water channels are formed and depending on the soil involved and the amount of slope water penetration can become a problem. On land with the proper grade for furrow irrgation, the normal procedure is to run a deep tillage sweep in the bottom of the furrow to increase the water penetration. On steep sloping fields, this is not practical because it sets the stage for a severe soil erosion problem. This invention forms small cavities on alternate sides of the furrow in a pattern that separates them by firm undisturbed soil.

SUMMARY OF THE INVENTION

In accordance with the present invention the cavities are formed by a perforating wheel having spikes which create a series of water-holding cavities without setting up a situation conducive to soil erosion. This procedure will more than double the amount of soil surface exposed to contact with the water thereby increasing the water penetration possibilities by an equal amount. Irrigation water or rainfall will fill these cavities with silt soil but it will still remain permeable to water penetration.

The cavities are formed by the spikes first penetrating the soil and then prying or gouging out a quantity of soil without compaction of the soil below or around the cavity occurring. The line between adjacent cavities in adjacent rows in a furrow is nonlinear and thus water flowing in the furrow is retarded thereby minimizing soil erosion.

The spikes are arranged in adjacent planes on a common hub and are mounted to a common mounting plate between the separate planes of spikes. The spikes are concave in shape and cross section as they face the cavity formed during operation as the wheel is rolled across the ground. The cavities may have a depth equal to approximately two-thirds the length of the spike. The outside wheel diameter may be approximately 21 inches. Spacing of the rows of cavities may be on the order of 3½ to 4 inches. The cavities within each row are spaced approximately 8 inches apart. The attachment of this invention may be used on different implements including planters and irrigation hiller row units.

DESCRIPTION OF THE DRAWINGS

FIG. 1 is a cross-sectional side elevation view of a irrigation hiller row unit in use with the ground conditioning device of this invention mounted thereon.

FIG. 2 is a fragmentary perspective view of the ground worked upon by the device of this invention.

FIG. 3 is a top plan view taken along line 3—3 in FIG. 1.

FIG. 4 is a cross-sectional view taken along line 4—4 in FIG. 3 again illustrating only the ground conditioning device.

FIG. 5 is a cross-sectional view of one of the spikes taken along line 5—5 in FIG. 4.

FIG. 6 is an end elevation view from the righthand side as viewed in FIG. 4.

DESCRIPTION OF THE PREFERRED EMBODIMENT

The ground-conditioning device of this invention is referred to generally in FIG. 1 by the reference numeral 10 and is shown mounted on an irrigation hiller row unit 12 having a furrowing shovel 14 followed by a pair of disc hillers 16. As seen in FIG. 2, the furrowing shovel 14 forms furrows 18 as the disc hillers 16 form the ridges 20. Row crops 22 have been planted on ledges 24 between the ridges 20 and the furrows 18. This is sometimes referred to as a Tri-Level-Bed, a no-tillage system of row crop farming with furrow irrigation. The Tri-Level-Bed may be prepared by a shaper or splitter such as disclosed in my U.S. Pat. No. 3,831,536, Aug. 27, 1974.

The hiller row unit 12 is used after the row crop 22 is established in a bed prepared by the splitter or shaper equipment. The hiller provides for ridging with an absolute minimum of root pruning with only the soil that is used to build the ridge being disturbed.

The shank 26 for the furrowing shovel 14 includes mounting brackets 30 for mounting to a tool bar, not shown. Mounting brackets 32 extend rearwardly from the shank 26 and connect to a secondary tool bar assembly 34 having front and rear toolbar portions 36 and 38 interconnected by opposite end plates 40. The front bar 36 carries the disc hiller 16 while the rear bar 38 supports the ground conditioning perforating wheel attachment 10 of this invention.

The attachment includes a support member 50 on one of a pair of clamping brackets 52 engaging the bar 38. Opposite the brackets 52 is a clevis bracket 54 on which a pivotal arm 56 is mounted by a pin 58. The arm 56 includes spaced apart arm portions 60 engaging opposite ends of a spindle 62 on which a wheel assembly 64 is rotatably carried. The wheel assembly 64 includes a hub 66 having a centrally positioned mounting plate disc 68 which in turn is provided with integrally mounted mounting fastener members 70 secured thereto by weldments 72.

Spikes 74 curved or concave along their longitudinal axis and being concave in transverse cross section are secured to the members 70 by backing plates 76 and mounting bolts 78 which extend through the backing plate 76, the spikes 74 and the elements 70.

The spikes 74 on opposite sides of the mounting plate disc 68 are staggered and spaced apart to provide two rows 80 and 82 of cavities 84 in each of the furrows 18. Each cavity 84 functions as a water pocket and is formed by a quantity of soil 86 being pryed out of the ground as the wheel assembly 64 rotates. The spike penetrates the ground first and then prys the soil 86 out leaving the cavity or pocket 84. The rows 80 and 82 minimize soil erosion since the water traveling in the furrow must move along a nonlinear path which tends to slow speed of the flowing water.

The pressure the wheel assembly 64 maintains on the ground may be varied by a pair of coil springs 90 having end portions 92 and 94. The end portion 92 is held in a stop 96 on the outside of each arm member 60. The coil portion of the spring is positioned on the pivot pin 58 while the other end 94 of the spring is in engagement with a stop pin 98 positioned in a row of pins 100 and 102. Removal of the pin 98 allows the end portion 94 to drop down into engagement with the pin 100 thereby lessening the downward pressure of the springs on the arm 56 and the wheel assembly 64.

In operation, the perforating wheel attachment 10 is run through furrows 18 at the desired time to produce the cavities 84 in the rows 80 and 82 with adjacent cavities along the furrow being staggered between the rows thereby retarding the flow of water in the furrows and consequently minimizing soil erosion. The water penetration will be obviously substantially increased due to the doubling of the soil surface exposed to contact with the water. The ground around the cavity is not compacted and thus irrigation water or rainfall will be able to penetrate walls of the cavity. Silt to fill in the cavity will also be penetrated by the water. Depending on the hardness of the ground the downward pressure may be varied by utilization of the appropriate stop pin 98, 100 or 102 in association with the springs 90. It is understood that the attachment of this invention may be used in all different types of feed beds and soil conditions to provide staggered rows of water holding and retaining cavities.

I claim:

1. A ground conditioning device comprising,
   an arm having mounting means at one end for connection to an implement frame,
   a plate disc member rotatably mounted to the other end of said arm, said disc member having first and second faces,
   a plurality of fastener elements securely mounted to and extending from said first and second faces in circumferentially spaced apart disposition, said fastener elements of said first face staggered circumferentially alternatively from said fastener elements of said second face, said fastener elements being concave longitudinally,
   a plurality of ground engaging spikes adapted to adjoin in nesting relationship said fastener elements so as to extend radially from said disc member,
   attachment means for detachably mounting said spikes in mating adjoining relationship to said fastener elements, and
   said ground engaging spikes being concave in transverse cross section and concave longitudinally to engage and scoop plugs of soil from the ground as said disc member rotates.

2. The device of claim 1 wherein said attachment means comprises said spikes and said fastener elements having bolt receiving apertures therethrough and a bolt means to securely mount said spikes to said fastener elements.

3. The device of claim 2 wherein said attachment means comprises a concave backing plate having a bolt receiving aperture therethrough and adapted to adjoin the longitudinally concave surface of said spike in nesting relationship.

* * * * *